United States Patent [19]
Downey et al.

[11] 3,829,205
[45] Aug. 13, 1974

[54] SENSING DEVICE FOR CONTROLLING MOTION-PICTURE PROCESSING AND VIEWING

[75] Inventors: Rogers B. Downey, Lexington; Paul W. Thomas, Duxbury, both of Mass.

[73] Assignee: Polaroid Corporation, Cambridge, Mass.

[22] Filed: Apr. 20, 1973

[21] Appl. No.: 353,009

Related U.S. Application Data

[63] Continuation of Ser. No. 227,083, Feb. 17, 1972, which is a continuation-in-part of Ser. No. 888,604, Dec. 29, 1969, Pat. No. 3,643,579.

[52] U.S. Cl. ............... 352/130, 95/89 R, 352/78 R
[51] Int. Cl. ............................................ G03c 11/00
[58] Field of Search .................. 352/130, 78 R, 72; 95/89 R, 13

[56] References Cited
UNITED STATES PATENTS

| | | | |
|---|---|---|---|
| 3,025,750 | 3/1962 | Polan et al. | 352/10 |
| 3,600,071 | 8/1971 | Downey | 352/130 X |
| 3,768,894 | 10/1973 | Cook | 352/130 |
| 3,778,140 | 12/1973 | Land | 352/130 |

Primary Examiner—Richard L. Moses
Attorney, Agent, or Firm—David R. Thornton

[57] ABSTRACT

An "information" providing and "sensing" apparatus or system for incorporation with a motion-picture film containing cassette and with a unit adapted to mount and function with the cassette after its previous mounting in a camera wherein the film had been exposed. The apparatus enables processing and subsequent viewing, i.e., projection of the film through a plurality of automatically controlled operations. The cassette includes certain self-contained means for processing the film with extreme rapidity. Both the cassette and mounting unit include elements cooperating with one another to perform essential functions such as "predetermination" by the mounting unit whether the film is in an unprocessed or processed state when the cassette is first mounted therein; accomplishment of film processing if unprocessed; preliminary determination of the film location within the cassette, that is, its position either on the supply reel or the takeup reel; and projection and rewinding of the film. All of the foregoing are accomplished automatically.

32 Claims, 11 Drawing Figures

SENSING DEVICE FOR CONTROLLING MOTION-PICTURE PROCESSING AND VIEWING

CROSS REFERENCES TO RELATED APPLICATIONS

This is a continuation of application Ser. No. 227,083, filed Feb. 17, 1972, which is, in turn, a continuation-in-part of Ser. No. 888,604, filed Dec. 29, 1969, now U.S. Pat. No. 3,643,579.

BACKGROUND OF THE INVENTION

1. Field of the Invention

This invention relates to photography and, more particularly, to an improved apparatus or system for automatically applying a uniform coating of processing fluid to a strip of exposed motion-picture film and immediately thereafter, rendering the film viewable, as by projection.

2. Description of the Prior Art

After motion-picture film has been exposed in a camera, it has generally been the practice for the photographer to send the container of exposed film to a processing laboratory. At the laboratory, the film is removed from the container and subjected to a series of operations in order to produce visible images from the images recorded thereon during the exposure operations. The fully developed film strip is then rewound onto a reel at the laboratory and returned to the user.

The extended delay normally incurred between the time exposed film is mailed to the laboratory and returned ready for viewing has proved to be a significant inconvenience to the user.

The field of still photography is no longer hampered by extensive periods of delay associated with the processing of exposed film. The impact on the public of the one-step photographic process employing diffusion transfer techniques is a matter of record and generally well known. The still photographer can now enjoy the fruits of his efforts in a matter of seconds. This important convenience has been available for several years.

Most recently, important technological advances have made it possible for the photographer interested in motion pictures to enjoy this same convenience. Radically different systems have now been developed which permit the photographer himself to quickly and easily process and project a strip of motion-picture film shortly after the pictures have been taken. Exemplary of such new and unique systems are those described in copending U.S. Pat. application Ser. No. 738,464 of Edwin H. Land filed June 20, 1968, now U.S. Pat. No. 3,655,277, and U.S. Pat. No. 3,615,127 issued to Edwin H. Land on Oct. 26, 1971.

In commercial and industrial applications, such rapid motion picture processing systems are not only an improvement as a matter of convenience, but have other important effects as well. For instance, motion picture programs can be presented on television for the viewing public shortly after events of interest have occurred and been photographed.

BRIEF SUMMARY OF THE INVENTION

The present invention is directed to an improved cassette and viewer comprising a system encompassing motion-picture photography, processing and viewing, such as projection, wherein a compact multipurpose film-handling cassette includes a processing fluid which is expressed through the orifice of a dispenser or applicator onto an exposed motion-picture film which is undergoing movement. The cassette is of a type providing, through the structural and positionable characteristics of its components, "information," or an indication, as to the processing and positional state of the film therewithin to a complementary mounting unit such as a viewer or projector. The mounting unit includes what may be termed a "sensor" or "sensing" components which "read" or "sense" the information thus provided and means for cooperating with the cassette for performing appropriate programs or operations with the film.

An object of the invention is to provide an improved motion-picture film cassette in which processing of the film is performed automatically.

Another object of the invention is to provide a motion-picture cassette in which processing of the film is performed and in which are included means providing information as to a processed or unprocessed condition of the film for selective use by sensing means of a mounting unit of the cassette.

A further object of this invention is to provide an improved film handling cassette capable of cooperating with other apparatus for performing either of two operational programs on the film and for indicating to the other apparatus whether one of the operational programs has been performed, and improved apparatus for receiving the cassette, sensing its indication, and cooperating therewith to perform at least one of the two operational programs.

Still another object of the invention is to provide a motion-picture cassette in which are included means for processing the film and means for indicating the processed or unprocessed condition of the film, the means being so relatively disposed as to provide an interaction of the functions.

A still further object of the invention is to provide a motion-picture cassette in which are included components for processing the film and components indicative of the processed or unprocessed condition and the positional state of the film, the components being unitary or in contact with one another for mutual operation.

An additional object of the invention is to provide a cassette of the character described in which the components thereof include slidable means for opening and closing a fluid valve and having portions releasably engageable with actuating means of a mounting unit, and means adapted to differentially operate electrical circuit means of the mounting unit dependent upon the functional position of the slidable means.

Also, an object of the invention is to provide a cassette and mounting means therefor adapted, when inserted in the mounting means, to the exposure, processing and projection of a motion-picture film, the cassette and mounting means including a plurality of mutually engageable and positionable components for uniquely indicating and responding to a processed or unprocessed condition of the film.

Another object of the invention is to provide a motion-picture cassette and complementary mounting means therefor, the two comprising interengageable and interacting components providing, respectively, an indication of the state of the film and requirements for its treatment and, automatically, a correct treatment of the film in accordance with the aforesaid indication, namely, its processing, rewind, takeup, projection or combination of these procedures.

Other objects of the invention will in part be obvious and will in part appear hereinafter.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DETAILED DESCRIPTION

Figure 1:
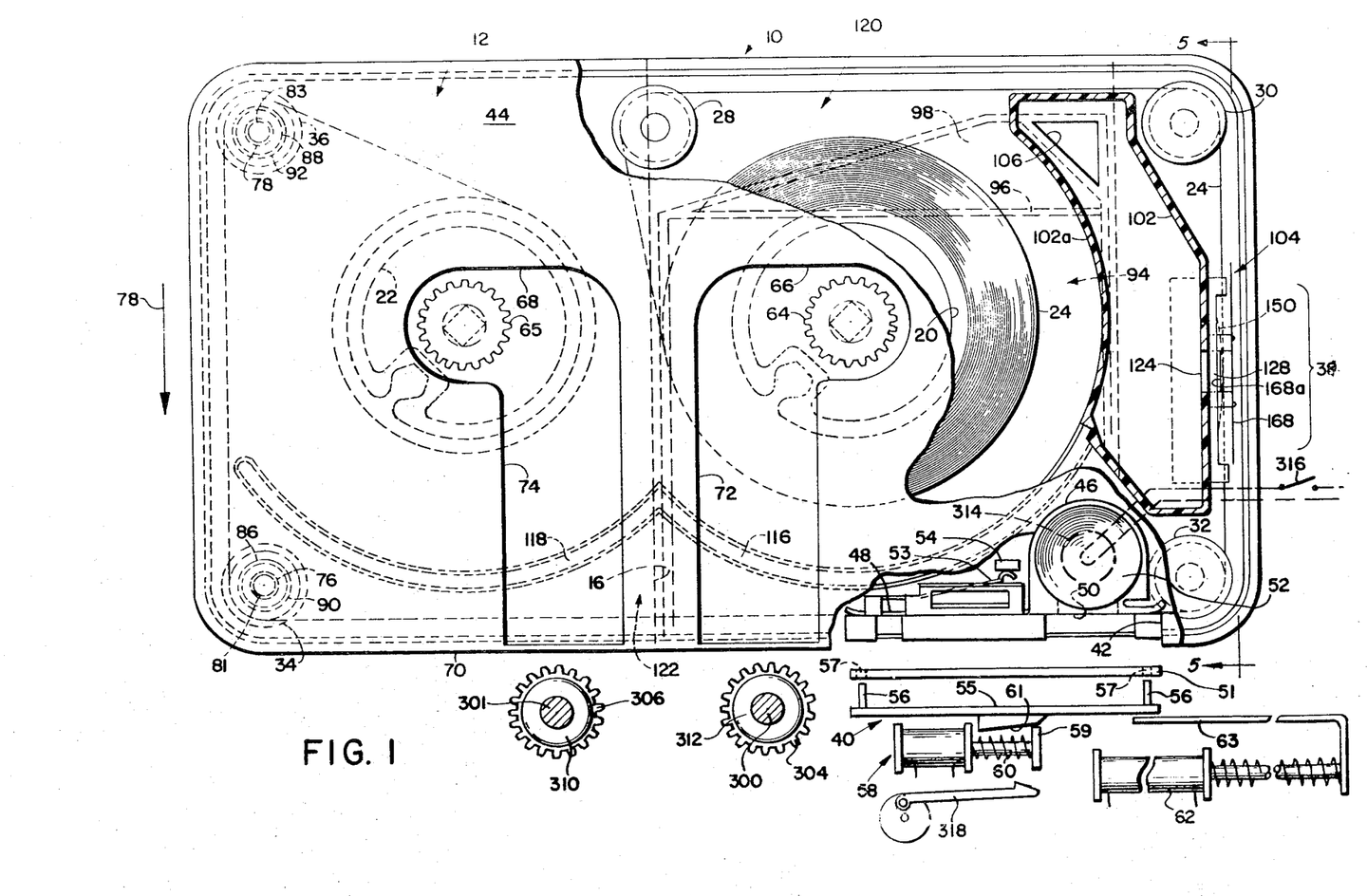
FIG. 1 is a diagrammatic cut-away frontal or upper plan view of a compact multipurpose motion-picture film-handling cassette embodying the features of this invention and cooperating elements of a unit intended to cooperate therewith.
Figure 2:
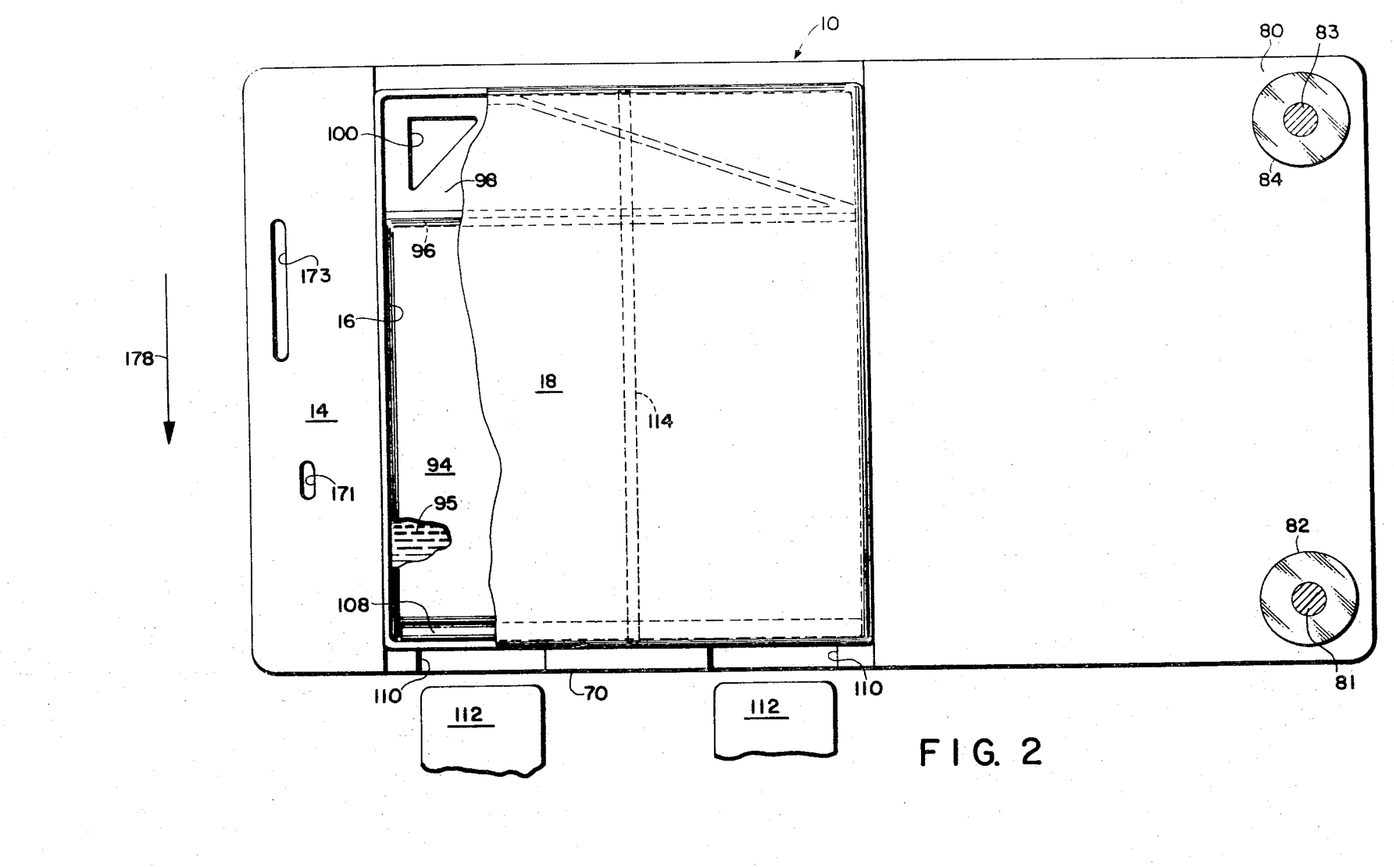
FIG. 2 is a fragmentary diagrammatic rear or underneath view of the cassette of FIG. 1.

The illustrated embodiment of this invention may best be understood by first referring to FIGS. 1 and 2 of the drawings. As may be seen therein, a compact multipurpose film handling cassette 10 is basically constituted by front and rear (upper and lower) housing members 12 and 14, respectively, and connected together to form an enclosed opaque housing. The housing member 14 is provided with a recessed portion 16 enclosed by a flexible cover-plate 18 which, in combination, define an enclosed area.

In this embodiment, the cassette is relatively thin and generally rectangular parallelepiped in configuration. A supply spool 20 and a takeup spool 22 are coplanarly mounted within the cassette for rotation about spaced apart parallel axes. An unexposed length of photographic material 24, provided with perforations 26 and with leaders affixed to the supply spool 20 and to the takeup spool 22 is initially substantially entirely coiled around the supply spool. Passing from the supply spool 20 to the takeup spool 22, the strip of photographic material sequentially travels around idlers 28, 30, 32, 34 and idler 36. Advantageously, the idlers 32 and 34 are positioned in opposite corners or extremities of the cassette and at one side of the supply spool 20 and the takeup spool 22. The idler 30 is advantageously positioned in a corner of the cassette at the side of the supply spool 20 opposite to that adjacent to the idler 32.

Intermediate the idlers 30 and 32, the film 24 passes through a processing station 38. Intermediate the idlers 32 and 34 it passes through an exposure and projection station 40. In this latter connection, a cut-out portion of the housing member 12 defines an opening or film gate 42 through which image carrying light rays may enter or leave the cassette and, further, through which an aperture plate of a camera (not shown) and an aperture plate 51 (FIG. 1) of a projector or viewer 174 (See FIG. 4) may be introduced into the cassette. Also, the upper or front wall 44 of the cassette includes an opening 46 communicating with the film gate 42 for purposes which will subsequently become obvious.

Mounted within the exposure and projection station 40 so as to be in alignment with the film gate 42 is a pressure-plate assembly 48 having an aperture 50 and which mounts a light-reflecting element 52. It will be noted that the light-reflecting element 52 is disposed in operable relationship to both the opening or film gate 42 and the opening 46 in the cassette's front wall 44. Thus, for projection purposes, light rays from an externally mounted light source, e.g., projection lamp 314 of the viewer 174, may be introduced into the cassette through the opening 46 onto the reflecting element 52 which redirects those rays outwardly of the cassette through the pressure-plate's aperture 50 and the section of the film 24 disposed thereacross. Typically, this light reflecting element 52 may take a configuration similar to the prismatic element described in more detail in the copending application Ser. No. 767,609 of Herbert A. Bing filed Oct. 15, 1968, now abandoned in favor of continuation application Ser. No. 118,963, filed Sept. 25, 1971. As such, it may include a concave light receiving transparent face adjacent to the cassette's opening 46 and a flat reflecting surface which reflects light received into the element through its concave transparent face outwardly thereof through a convex transparent face adjacent to the pressure-plate's aperture 50. Alternately, it may take the form of the prism disclosed in copending application Ser. No. 214,591 of Philip G. Baker, filed Jan. 3, 1972.

The pressure plate 48 is mounted within the cassette so that it may be displaced inwardly of the cassettte against the force of a flat spring 53 integral with the pressure-plate 48 and bearing against a fixed stud 54 whenever desired as, for example, when an aperture plate of a camera or projector is positioned in operative relationship therewith. Such an aperture plate 51, which may take a conventional form, is diagrammatically represented in exploded form in FIG. 1 and may be considered as forming part of the projector or viewer 174 diagrammatically depicted in FIG. 4. As such, when the cassette 10 is positioned in the viewer 174, the aperture plate 51 slideably engages the film strip 24 against the pressure plate assembly 48 and displaces that assembly inwardly of the cassette to position the section of film strip disposed thereacross in the proper plane for projection operations. Preferably, the viewer 174 would also include a plate 55 carrying arms or pins 56 aligned with apertures 57 of the aperture plate 51 for selective engagement with the pressure plate assembly 48. In this connection, a solenoid 58 is mounted adjacent to the plate 55. When the solenoid is energized, a tang 59 at the extremity of the solenoid core 60 is adapted to slide along the surface of a cam 61 on the surface of plate 55 and push this plate and its pins 56 inwardly of the cassette 10 whereby the pressure plate assembly is displaced away from the aperture plate 51 against the bias of spring 53 thereby relieving frictional forces on the film 24. Also located in the viewer 174 is a solenoid element 62 adapted to move a light-baffle 63 of that unit across the cassette's gate 42 when unprocessed film is passing thereacross. This light baffle 63 may be provided with a member (not shown) which moves across the cassette's opening 46 at the same time.

Axially connected to the supply spool 20 and to the takeup spool 22, respectively, are a pair of spur gears 64 and 65. The outer or frontal surfaces of these spur gears are substantially flush with the generally flat exterior surface of the cassette's front wall 44. More specifically, the gears 64 and 65 are respectively mounted for rotation within recessed portions 66 and 68 of side wall 44.

Extending from a leading edge 70 of the cassette, in terms of the direction of insertion of the cassette into the mounting unit 174 (FIG. 4) therefor, into communication with the recessed portions 66 and 68, respectively, are a pair of similarly recessed channels 72 and 74. These channels 72 and 74 are spaced closer together than are the axes of the spur gears 64 and 65 so as, respectively, to form, in conjunction with the recessed portions 66 and 68, substantially right-angle depressions in the generally flat exterior surface of the cassette's front wall 44. This arrangement permits a pair of external coplanarly mounted driving spur gears 304 and 306 (FIG. 1), e.g., of the viewer 174 (See FIG. 4), to be displaced along the channels 72 and 74 from a position adjacent to the cassette's edge 70 into engagement with the cassette's spur gears 64 and 65. As diagrammatically illustrated in FIG. 1, these gears 304 and 306 may be considered as forming part of the viewer 174 and are adapted to be respectively driven by drive shafts 300 and 301 of that unit through slip-clutch arrangements 312 and 301 as is conventional in motion picture projection (and exposure) operations. Such externally mounted driving spur gears are adapted to alternately drive the cassette's gear 65 in a clockwise direction and the cassette's gear 64 in a counterclockwise direction (as viewed in FIG. 1 of the drawings), and therefore means are available to effect reversible transport of the film strip 24 between the spools 20 and 22 and across the exposure and projection station 40 and the processing station 38. It will be appreciated that these driving gears 304 and 306 may be located within the viewer 174 to automatically engage, respectively, gears 64 and 65 of the cassette 10 when it is slideably inserted in the viewer's recess 176 (See FIG. 4).

Referring to the idler rollers 34 and 36, snubbers 76 and 78 frictionally engage the cores of the idler rollers 34 and 36 and rotate therewith. The rear extremities of the snubbers pass through the cassette's rear or under wall 80. Thus, externally mounted force-applying members, such as the spring-biased movable cores 81 and 83 of a pair of solenoids 82 and 84 appropriately positioned in the viewer 17 (FIG. 2), may selectively be brought into locking engagement with the snubber extremities to preclude rotation of the idlers. In this manner, the idlers 34 and 36 may be employed to effectively snub the film strip 24 during film exposure operations, when the cassette 10 is positioned in an appropriate camera (not shown), and projection operations in conformance with the conventional requirement of an intermittent movement. To preserve the light-tight nature of the interior of the cassette, annular projections 86 and 88 (FIG. 1) extend interiorly of the cassette from the wall portion 80 and annular projections 90 and 92 extend from the idlers 34 and 36, respectively, into side-by-side light sealing relationship with the projections 86 and 88.

A rupturable pod or container 94 (FIGS. 1 and 2) holding a processing fluid 95, is positioned in the recessed section 16 of the rear or lower housing member of the cassette. This pod 94 includes a weakened seal at 96 attached to and leading into a fluid feeding device 98 provided with an aperture 100. The fluid feeding device aperture 100 communicates with a reservoir chamber 102 of a fluid-applicator element 104 through a connecting opening 106 of the chamber. The capacity of the reservoir chamber 102 is at least equal to that of the pod 94. As shown in the illustrated embodiment, the reservoir 102 of the fluid-applicator element 104 is uniquely configured to make maximum utilization of the available space within the cassette.

The fluid-holding pod 94, positioned within the recessed area 16 is subject to compression to break the frangible seal 96 and release its content. A pod-rupturing rod 108 is movably-located within the area 16, being initially positioned adjacent the extremity of the pod 94 remote from the fluid-release seal 96. Two slots 110 are provided in the cassette housing so as to lead inwardly of the rear housing member 14 and the flexible cover-plate 18 so that externally mounted force-applying members 112 of the viewer 174 may be selectively introduced into the cassette to engage the aforementioned pod-rupturing rod 108 and to effect a displacement of that rod across the pod 94 and then across the adjacent area 98. For purposes of the illustrated embodiment of the present invention, it should be understood that these members 112 are fixedly positioned to automatically enter the cassette 10 and effect such a displacement of its rod 108 in the process of inserting the cassette into the viewer's recess 176 (See FIG. 4). Extending from and across the inside face of the flexible cover plate 18 is a rib 114. As the rod 108 is moved across the pod and area 98, it rides on the rib 114 causing the plate 18 to flex outwardly of the cassette. The force applied by the rod against the pod ruptures the seal 96 thus causing processing fluid to be expelled from the pod, through the fluid feeding device 98 and aperture 100 into the reservoir chamber 102.

Mounted between the front and rear walls 44 and 80 of the cassette is a light-sealing arcuate member 116, one end of which is positioned against the fluid chamber 102. The other end of the member 116 is connected to an end of a second light-sealing arcuate member 118 which extends to within the vicinity of the idler 34. These arcuate members 116 and 118 may, for example, be integral with the housing member 14 and in combination with the chamber 102, serve, effectively, to divide the cassette into a first compartment 120 sealed in a light-tight manner from a second compartment 122. Any other suitable means may be employed to light seal the interior of the cassette from the section of the film strip 24 disposed across the opening 42. Additionally, it will be noted that in the illustrated embodiment, the supply spool 20, the light sealing arcuate member 116 and a wall section 102a of the chamber 102 share a common center of curvature. Thus the arcuate member 116 and the wall portion 102a further serve to control the disposition of that portion of the film 24 coiled around the supply spool 20. Similarly, the takeup spool 22 and the light-sealing arcuate member 118 share a common center of curvature and, consequently, the arcuate member 118 serves to control the disposition of that portion of the film 24 coiled around the takeup spool.

Idler 32, around which the film 24 passes on its way from the supply spool 20 to the pressure-plate assembly 48, may, if desired, be mounted on a movable post spring-biased toward the corner which it occupies in the housing of the cassette and capable of being moved resiliently inwardly away from that corner. Also, idler 34 may be spring-biased toward the corner which it occupies in the housing of the cassette and capable of being moved resiliently inwardly away from that corner. This provides a lessening of strain exerted on the film 24 during film advancement by conventional intermittent movement means of a camera (not shown) and the viewer 174 respectively involved in exposure and projection operations.

The housing members 12 and 14, as well as elements associated therewith, e.g., the arcuate members 116 and 118, the annular projections 86 and 88 and the mounting structure for the idlers may, for example, be formed from a suitable thermoplastic resin, such as an acrylic or a polystyrene, in a precision yet inexpensive injection molding process. Similarly, the flexible coverplate 18, the spur gears 64 and 65, the idlers 38, 30, 32, 34 and 36 and the spools 20 and 22 may, if desired, be formed by injection molding processes employing similar types of material. In the case of the gears 64 and 65 and the aforementioned idlers, a relatively low friction material such as an acetal or nylon would preferably be employed.

Components particularly relating to the subject invention are indicated in FIGS. 3 through 10 of the drawings. As shown in the illustrated embodiment, the fluid applicator element 104 basically comprises the fluid-reservoir chamber 102 and, unitary therewith, fluid dispensing, control and information-providing or indicating means relating to the condition and required treatment of the film within the cassette. An orifice 124 is provided in the wall 126 of the chamber 102 and a rectangular projection or mouth 128 extends forwardly from the face of the wall around the periphery of the orifice. A section 131 of the projection 128 is tapered so as to form a doctor blade 129. Four mounting and guide brackets 130, 132, 134 and 136, each having a mounting pin or stud 138 are integral with and project forwardly from and a slightly beyond the mouth 128. A slider element 140, in the form of a generally rectangular frame component 141 defined by the members 142, 144, 146 and 148, has a strip of flexible material 150, such as the plastic film material known as "Mylar," sold by E.I. duPont de Nemours Co., Wilmington, Del., fastened thereto by the perforations 152 and pins 154 so as to extend horizontally between the frame members 144 and 148. An orifice 156 is formed in the strip 150 for alignment with and removal from the mouth 128 to control the emission of the processing liquid therefrom. Assuming the slider element 140 with the strip 150 mounted thereon to be brought into proximity with the orifice 124, the strip is adapted to slide across the mouth 128 between the guide brackets 130–136, the slide member 146 bearing lightly and slideably against a pair of rails 158 extending lengthwise of the under surface of chamber 102.

Figure 3:
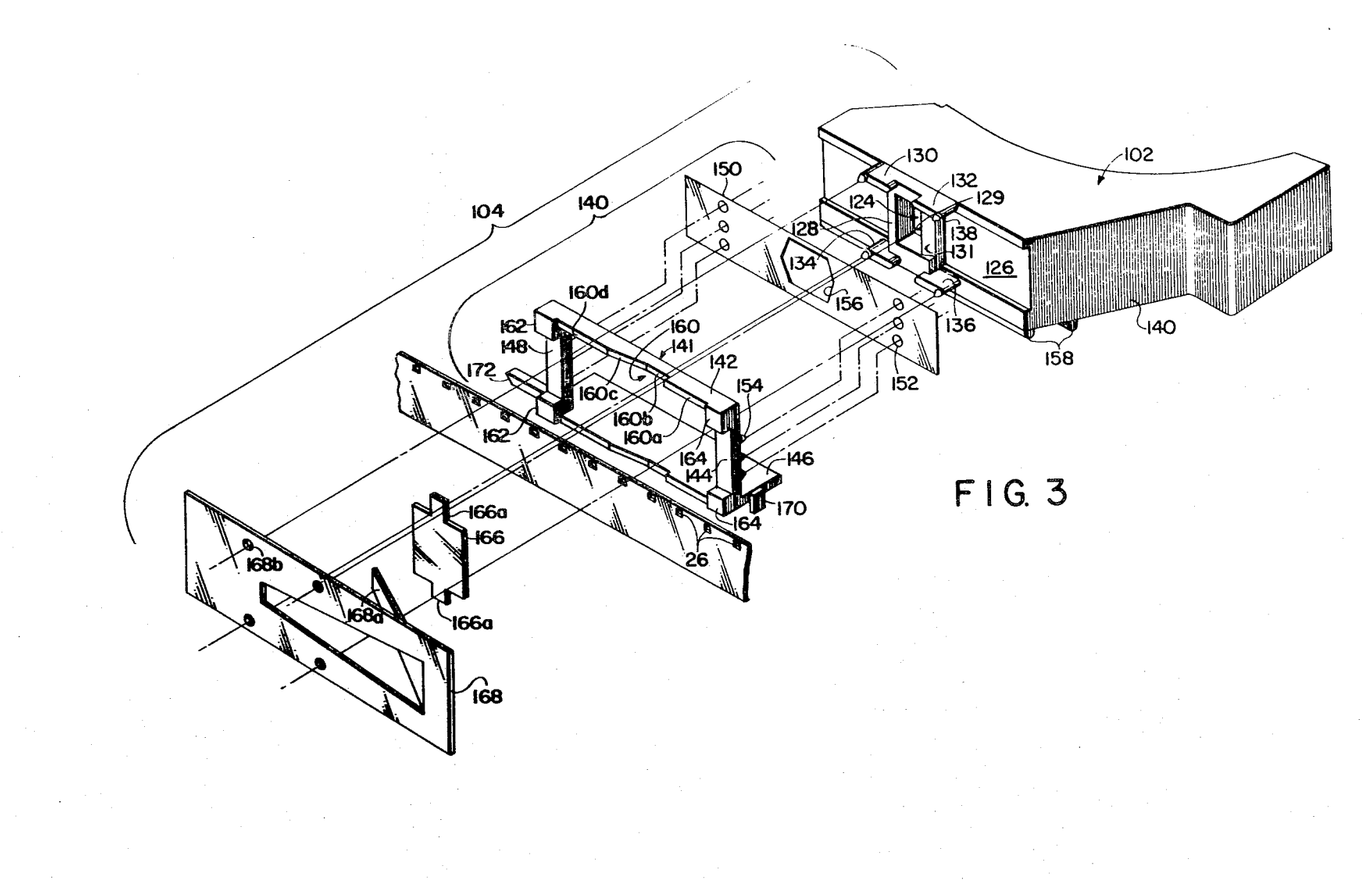
FIG. 3 is a diagrammatic exploded perspective view of the processing-fluid dispenser and fluid-applicator release-valve of the invention.

It will be noted that the front surfaces of the horizontal members 142 and 146 of the slider frame component 141 are specially configured and constitute a pair of identical upper and lower guide tracks 160, comprising functional portions 160a, 160b, 160c and 160d, the purpose of which will be explained below. Pairs of guide shoulders 162 and 164 extend forwardly of frame members 142 and 146 at each horizontal extremity thereof, their function being to guide the film 24 during its slideable movement across the frontal surfaces of frame members 144 and 148.

A pressure-plate 166, composed of a rigid material, for example, a plastic such as a glass-filled nylon or of a metal such as stainless steel, comprises a pair of tablike projections or ears 166a adapted, under imposed bias, to bear predeterminedly against the above-denoted portions of guide tracks 160. The aforesaid bias is provided by the flat-spring member 168a of plate 168 when the latter is fastened to the brackets 130–136 through the instrumentality of the plate perforations 168b and the bracket pins 138, the pressure plate then being positioned directly in front of the mouth 128. It is to be noted that the frame member 146 of the slider includes a downwardly-projecting tang or tab 170, employed for moving the slider element by external driving means to be described, and a horizontally extending arm 172 which operates switching means of the complementary mounting unit, i.e., the viewer 174 and the several positions of which, during movement of the slider element, provide "information" or an indication relative to the processing condition of the film 24 within the cassette. Access to the tang 170 is provided by the slot 171 (FIG. 2), while access to the arm 172 is through the slot 173, both slots being formed in the rear or underneath wall 14 of the cassette. It is to be noted that the slots are offset, laterally, As will be described in greater detail hereinafter, with the slider element 140, the pressure-plate 166 and the plate 168 in assembled relation and with the latter mounted on the brackets 130–136, an initial position of the slider element, when the cassette is purchased, assumes the aperture 156 of the slider strip 150 to be positioned to the left of the orifice mouth 128 (FIG. 5), thereby sealing the mouth against escape of the processing liquid. Coincidentally therewith, the initial position of the pressure plate 166, assumes the pressure-plate ears 166a to be firmly seated against the guide-track portions 160a under the bias applied to the pressure plate 166 by the spring 168a. At this stage, the film 24 is maintained in slightly spaced relation both to the pressure plate and to the strip 150 and is permitted maximum freedom of movement. When the slider element 140 is moved to the right, the aperture 156 of the slider strip is aligned with the mouth 128 (FIG. 6) and the processing fluid is emitted. The pressure-plate ears 166a have dropped into the guide-track portions 160b and the film 24 has thus been brought into firm but slidable contact with both the pressure-plate 166 and the slider strip 150 whereby, assuming the film to be undergoing movement between takeup and supply spools of the cassette, the processing fluid, passing through both the mouth 128 and the slider-strip orifice 156 superimposed therewith, is applied to the inner or emulsion side of the film in a controlled manner by the doctor blade 129 with the amount of developer controlled, in part, by the gap between the doctor blade 129 and the surface of the film. This gap, in turn, is determined by the thickness of the slider strip 150 which spaces the film 24 away from the surface of the mouth 128. In this respect, it should be noted that the aperture 156 of the slider strip is configured to extend beyond the end of the projection 128 adjacent its doctor blade 129 at such times and the section of the slider strip extending beyond the projection is canted towards the reservoir chamber 102. This arrangement permits the fluid applied to the film 24 at the doctor blade to be carried by the film without subsequently touching the surface of strip 150, as it is drawn onto the supply spool 20.

After completion of the foregoing operation, which assumes a complete coating and processing of the motion-picture film 24, the slider element 140 is again moved to the right (FIG. 8), the aperture 156 once more moving to the side of the mouth 128 so as to close the orifice 124, the pressure-plate ears 166a moving along the inclined or obtusely angled guide track portions 160c and coming to rest on the portions 160d which are substantially the same, in terms of forward projection, as the portions 160a. The film 24 is then again free to move unrestrictedly, out of contact with the pressure-plate 166 and the strip 150. From the foregoing description it will be seen that the fluid applicator device 104, constitutes supply, control- or release-valve means and applicator means with respect to the processing fluid 95 and its dispensal to the film 24. Furthermore, the device incorporates means providing, through the medium of tab 170 and arm 172 thereof, information or an indication relative to the state of the film 24 at various stages.

Referring now to FIGS. 4-8, operation of the slider element 140 and actuating means for moving the same identified with both the slider element per se and with the mounting unit or viewer 174 therefor are shown in detail. Also functionally illustrated, the heretofore-mentioned information providing or indicating means identified with the slider element actuate "sensing" and responsive means of the mounting unit 174. For purposes of clarity, certain details of the fluid applicator 104, including the pressure-plate 166, and the plate 168 have been omitted as they would obscure the significant portions. The mounting unit 174 may, appropriately, be taken as a special form of motion-picture projector including components concerned with the film processing and projection operations. The sensing means initiate the operation and sequencing of a plurality of components involved in the selective treatment of the motion-picture film for processing and projection purposes.

Figure 4:
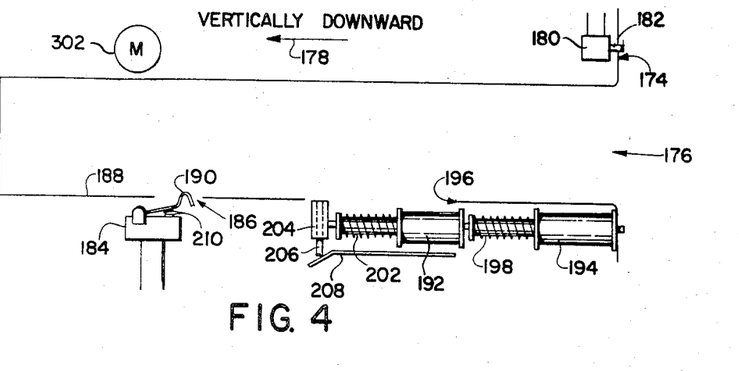
FIG. 4 is a fragmentary diagrammatic view of a portion of a unit including control and sensing means adapted to mount the cassette for processing and related purposes.

In FIG. 4 there is illustrated, in diagrammatic form, the cassette-receiving portion of the viewer 174 which, basically, is a preferably vertically disposed cavity or recess 176 for slideably accommodating the cassette therein. This vertical arrangement facilitates gravitational flow of the fluid 95 from the reservoir chamber 102 to the orifice 124. Accordingly, the cassette, in FIGS. 1 and 2, is adapted to be inserted vertically downward, in the direction of the arrow 178 into viewer 174. Mounted in the viewer is a momentary contact push button switch 180, the movable contact element 182 thereof being actuated by an operator. A microswitch 184 is mounted adjacent to a slot 186 formed in a wall 188 in part forming the aforesaid recess 176, the resilient contact-arm 190 of the switch extending within the slot 186 and the aligned slot 171 of the cassette (FIG. 2). Two solenoids 192 and 194 are mounted adjacent to a second slot 196 formed in the wall 188. The solenoid 194 is fixedly mounted on a portion of the viewer 174. The solenoid 192 is attached to the extremity of the movable core 198 of the solenoid 194 and, accordingly, is movable therewith.

A releasable linkage or latching means 200 for engaging the tang 170 of the slider element 140 is attached to the extremity of the movable core 202 of the solenoid 192. This linkage comprises a cylinder 204, a spring biased pin element 206 slideably mounted in a bore of the cylinder and guide means 208 for selectively forcing the pin into the slot 196 and the aligned slot 173 of the cassette (FIG. 2).

Figure 5:
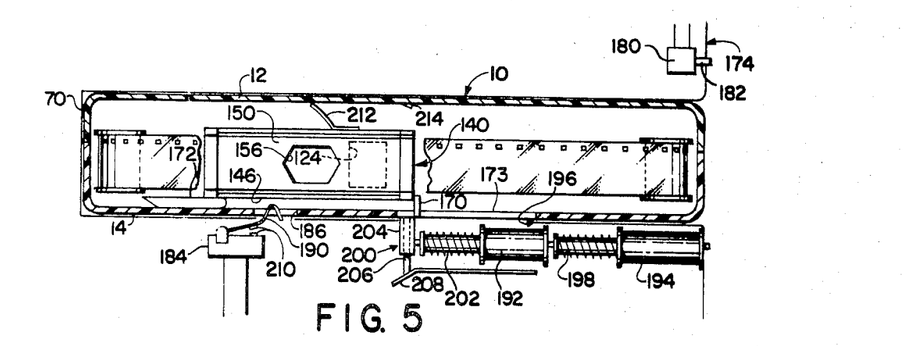
FIG. 5 is a fragmentary diagrammatic end view of the cassette, with parts broken away, taken along the line 5—5 of FIG. 1 illustrating a first closed position of the fluid-applicator release valve and including a portion of the mounting unit shown in FIG. 4.
Figure 6:
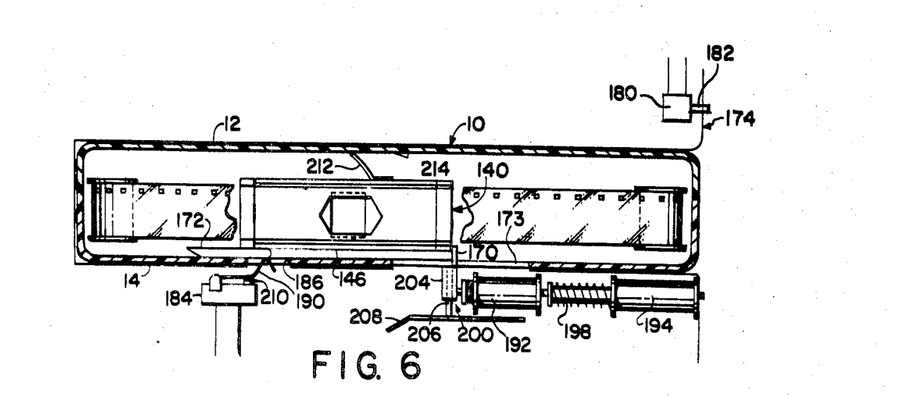
FIG. 6 is a fragmentary diagrammatic end view of the cassette taken from a position similar to that of FIG. 5 illustrating a second open position of the fluid-applicator release-valve.

When the cassette 10 is first inserted in the viewer 174, as shown in FIG. 5, the pin element 206 is in position to enter the slots 196 and 173 and engage the tang 170. It is to be noted that the orifice 124 is closed. Upon energization of the solenoid 192, the solenoid core 202 has undergone retraction, and the pin 206, in engagement with the tang 170, has drawn the slider element 140 to the position shown in FIG. 6, thus opening the orifice 124 to permit release of the processing fluid and closing the contacts 210 of switch 184. When the slider element 140 is drawn to the position shown in FIG. 8, through energization of the solenoid 194, the orifice 124 has again been closed, the switch contacts 210 are still closed, and the tip of a resilient arm 212, integral with the slider element 140, has entered a latch recess 214. Accordingly, the slider element is now held permanently against return movement when the solenoids 192 and 194 are deenergized and their cores return to their original positions under bias applied by their respective compression springs. As previously implied, the pin element 206 is spring biased towards the guide 208 so that it automatically returns to its original position (See FIG. 4) exteriorly of the cassette at such time.

Figure 7:
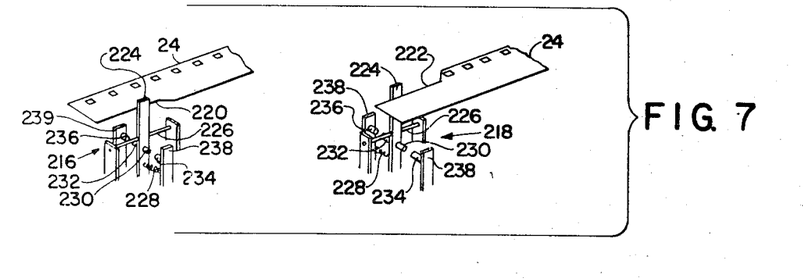
FIG. 7 is a fragmentary diagrammatic perspective view of film-sensor means of the unit of FIG. 4 engaged with appropriate cut-out sections in the edges of the film housed within the cassette.

FIG. 7 illustrates a pair of film sensor devices 216 and 218 of the viewer 174 adapted to operate in conjunction with cut-out edge sections 220 and 222, respectively, of the film 24. Each sensor device is identical to the other except that they operate at opposite sides of the film. Preferably they extend through the cassette's opening 42 into engagement with the edges of the film strip as it is advanced across that opening. The sensor 216 may, for example, be regarded as operative in response to an excised edge portion of the film leader; the sensor 218 as operative in response to an excised edge portion of the film trailer. Each sensor comprises a central arm or finger 224, mounted on pivotal means 226. The upper portion of arm 224 is adapted to contact an edge of film 24 and to be biased thereagainst, as by the compression spring 228. The arm 224 includes electrical contacts 230 and 232, at opposite surfaces thereof, adapted to selectively engage fixed contacts 234 and 236 of posts 238 and 239 during pivotal movement of the arm 224. Any other suitable arrangement may be employed to obtain an indication when the film strip 24 has reached the respective ends of its run within the cassette 16.

The applicator system of the hereinbefore described cassette-type motion-picture system, less the indicating and sensing means associated therewith and the programmed operations automatically performed responsive to the signal from the sensing means was the subject of the aforementioned copending application Ser. No. 888,604, filed on Dec. 29, 1969, now U.S. Pat. No. 3,643,579. The present invention is directed to arrangements wherein the cassette and projector components are respectively provided with cooperating, indicating and sensing means to facilitate the performance of desired alternate operational programs on the film strip housed within the cassette by other cooperating elements of those components. Other elements of the hereinbefore described motion-picture system, e.g., the pressure plate assembly, the light reflecting element, the film gate arrangement, the rupturable pod-fluid feeding device assembly, the pod rupturing means and the gear drive arrangement are the subject of other applications and patents assigned to the assignee of the present invention and, as such, do not constitute a part hereof.

For exposure purposes, the cassette 10 is mounted in an appropriate camera (not shown) with the drive means of the camera engaging the gears 64 and 65 through friction clutching arrangements as is conventional. While the particular camera employed does not form part of the present invention, it should be noted that it should include pins located to engage the cassette's snubbers 76 and 78 to restrain rotation of the cassette's rollers 34 and 36 at least during film exposure operations. The aperture plate of the camera, which may also take a conventional form, operably engages the cassette's pressure plate assembly 48 to position the section of the film strip 24 disposed thereacross in the proper focal plane. Also, a conventional intermittent film advancement mechanism of the camera engages the perforations 26 of the film strip 24 to effect its proper step advancement across the pressure plate assembly 48. In this manner, the operator can selectively record images on the photosensitive film strip 24 as it traverses the cassette's opening 42 on its way from the supply spool 20 to the takeup spool 22. In the embodiment illustrated, the photosensitive surface of the film strip 24 faces inwardly of the cassette 10 such that exposure of the photosensitive emulsion is effected through its transparent film base. After the film strip 24 has been completely exposed, the cassette can be quickly removed from the camera and replaced, when desired, by an identical cassette containing unexposed film. During these exposure operations, the film strip 24 is advanced from its initial position around the supply spool 20 to a position where it is coiled around the takeup spool 22 with the cassette's processing station 38 remaining in its normally inoperative position, i.e., in its condition depicted in FIG. 5 of the drawings.

After the strip of photographic material 24 has been exposed during its travel from the supply spool 20 onto the takeup spool 22 with the cassette 10 mounted in an appropriate camera (not shown), the exposed film strip is preferably processed and projected with the cassette 10 mounted in the specially devised viewer unit 174 diagrammatically illustrated in FIG. 4 of the drawings. As shown therein, the cassette 10 is inserted downwardly into the viewer 174 through its elongated recess 176 which may be appropriately provided in the viewers's top panel. When fully inserted therein, the viewer's members 112 have effected the rupture of the pod 94 and the light reflecting element 52 of the cassette 10 is disposed in operable relationship with the projection lamp 314 of the viewer 174. The lamp 314 is arranged to be selectively energized by a switch 316 (See FIG. 1) of the viewer 99. Further, at such time, the gears 64 and 65 of the cassette 10 are respectively engaged by the aforementioned drive gears 304 and 306 (See FIG. 1) connected to the viewer's motor 302 (See FIG. 4) through conventional slip-clutch arrangements 312 and 310 (See FIG. 1). Thus, the viewer includes means for selectively and alternately driving the supply spool 20 and takeup spool 22 of the cassette 10 in counterclockwise and clockwise directions, respectively, as viewed in FIG. 1 of the drawings.

The cassette 10 and viewer 174 are preferably provided with cooperating means for releasably latching the cassette in its operative position within the viewer and for selectively effecting an ejection of the cassette from the viewer. These latching and ejection means do not form part of the present invention and may take any suitable form, for instance, that depicted in copending U.S. Pat. application Ser. No. 838,793 filed on July 3, 1969 by Philip G. Baker, now U.S. Pat. No. 3,641,909.

Mounted within the viewer 174, as previously indicated, for selective axial displacement toward and away from the cassette 10 are cores 81 and 83 of solenoids 82 and 84 which may be selectively energized to restrain rotation of the cassette's rollers 34 and 36.

Further, when the cassette 10 is disposed in its operative position within the viewer 174, the cassette's processing station 38 can then selectively be rendered operative by energizing the viewer's solenoid 192. This operation has the effect of displacing the cassette's slider 140 from its position and condition depicted in FIG. 5 of the drawings into its position and condition depicted in FIG. 6 of the drawings wherein the slider's arm 172 has engaged the switch 184 causing its contacts 210 to close. The drive shaft 300 may thus subsequently be energized by the viewer's motor 302 to effect the return of the exposed film strip from the cassette's takeup spool 22 onto its supply spool 20.

Figure 8:
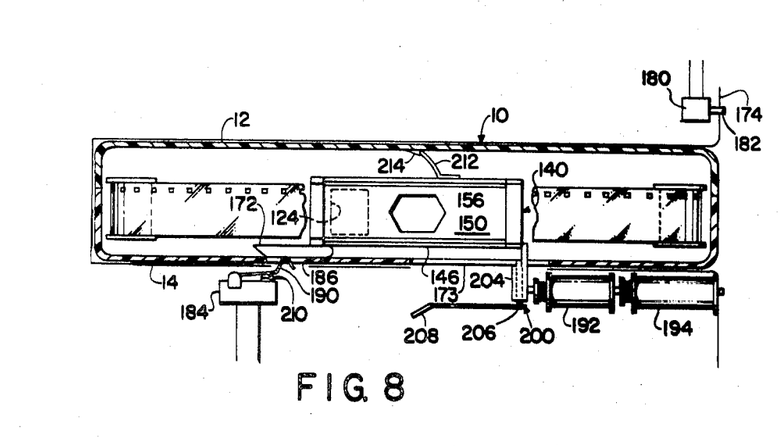
FIG. 8 is a fragmentary diagrammatic end view of the cassette taken from a position similar to that of FIG. 5 illustrating a third closed position of the fluid-applicator release-valve.

After the film strip 24 has been treated with the processing fluid 95 during its return to the supply spool 20, the solenoid 194 associated with the cassette's slider 140 may be energized to effect the displacement of slider 140 into its position and condition depicted in FIG. 8 of the drawings. It is important to note that, at such time, further movement of the slider 140 within the cassette 10 is precluded by the arm 212 which is seated in the latching recess 214, the contacts 210 of the switch 184 remaining closed. This condition exists within the cassette 10 even after the solenoids 192 and 194 are subsequently deenergized. Thus, whenever the cassette 10 with its processed film strip 24 is subsequently inserted into the viewer 174 it will automatically effect a closing of the switch contacts 210. It will thus be appreciated that the position of the slider arm 172 within the cassette 10 constitutes means for indicating to the viewer 174 whether the film strip 24 has been treated with the processing fluid 95. Further, the switch 184, responsive to the position of the cassette slider 104, i.e., it either remains open or is closed thereby, detects the position of the slider 140, and therefore the processed or unprocessed condition of the film strip 24 within the cassette 10, and thus constitutes means for the viewer 174 to sense such indication from the cassette.

To facilitate film processing operations, or for that matter any operations involving the return of the film strip 24 from the takeup spool 22 to the supply 20 when the cassette is in the viewer 174, it is desirable to reduce frictional forces acting against the film. In this connection and as previously indicated, the viewer 174 includes the aformentioned solenoid 58 for selectively displacing the pins 56 (see FIG. 1) inwardly of the cassette 10 against its pressure plate assembly 48. It will be recalled that this action causes the pressure plate assembly 38 to move inwardly of the cassette thereby releasing the film strip 24 from its frictional engagement between the cassette's pressure plate assembly and the viewer's aperture plate 51.

During that period of time when the cassette's processing station 38 is rendered operable and the film strip 24 is advanced therethrough towards the supply spool 20, the solenoid 62 is energized to displace the light baffle 63 into overlaying position with respect to the cassette's opening 42 to preclude light rays from striking the exposed unprocessed film strip 24 as it progresses across that opening of the cassette.

The viewer 174 further includes other conventional elements, e.g., an intermittent film advancement mechanism including the claw 318 depicted in FIG. 1, a shutter mechanism and a lens system. It will be appreciated that, once the film strip 24 has been treated with the processing fluid 95 during its initial return to the cassette's supply spool 20, the viewer's lamp 314, its drive shaft 301 and its aforementioned intermittent film advancement may be energized to effect a projection of the processed film strip as it is advanced across the cassette's opening 42 towards the takeup spool 22. Of course, during such operations rotation of the cassette's rollers 34 and 36 should be restrained by operation of the viewer's solenoids 82 and 84 and the pins 56 withdrawn to permit the pressure plate assembly 48 to slideably engage the film strip 24 against the viewer's aperture plate 51. In connection with these film projection operations, light rays from the projection lamp 314 are redirected by the cassette's light reflecting element 52 outwardly of the cassette through the aperture 50 of the pressure plate assembly 48, the film strip 24 and the cassette's opening 42. These now image-carrying light rays are further focused by the viewer's lens system onto a suitable viewing screen which may be mounted in the viewer 174. For instance, the viewer 174 may comprise a projection arrangement similar to that disclosed in copending application Ser. No. 174,373 entitled "Projector Apparatus" by Philip G. Baker, et al. filed Aug. 24, 1971. The invention also encompasses apparatus which projects the images onto a screen positioned remote therefrom.

Complementary means may be provided in the viewer and cassette, if desired, to effect a flow of air through the cassette during the film processing and/or film projection operations.

Figure 9:
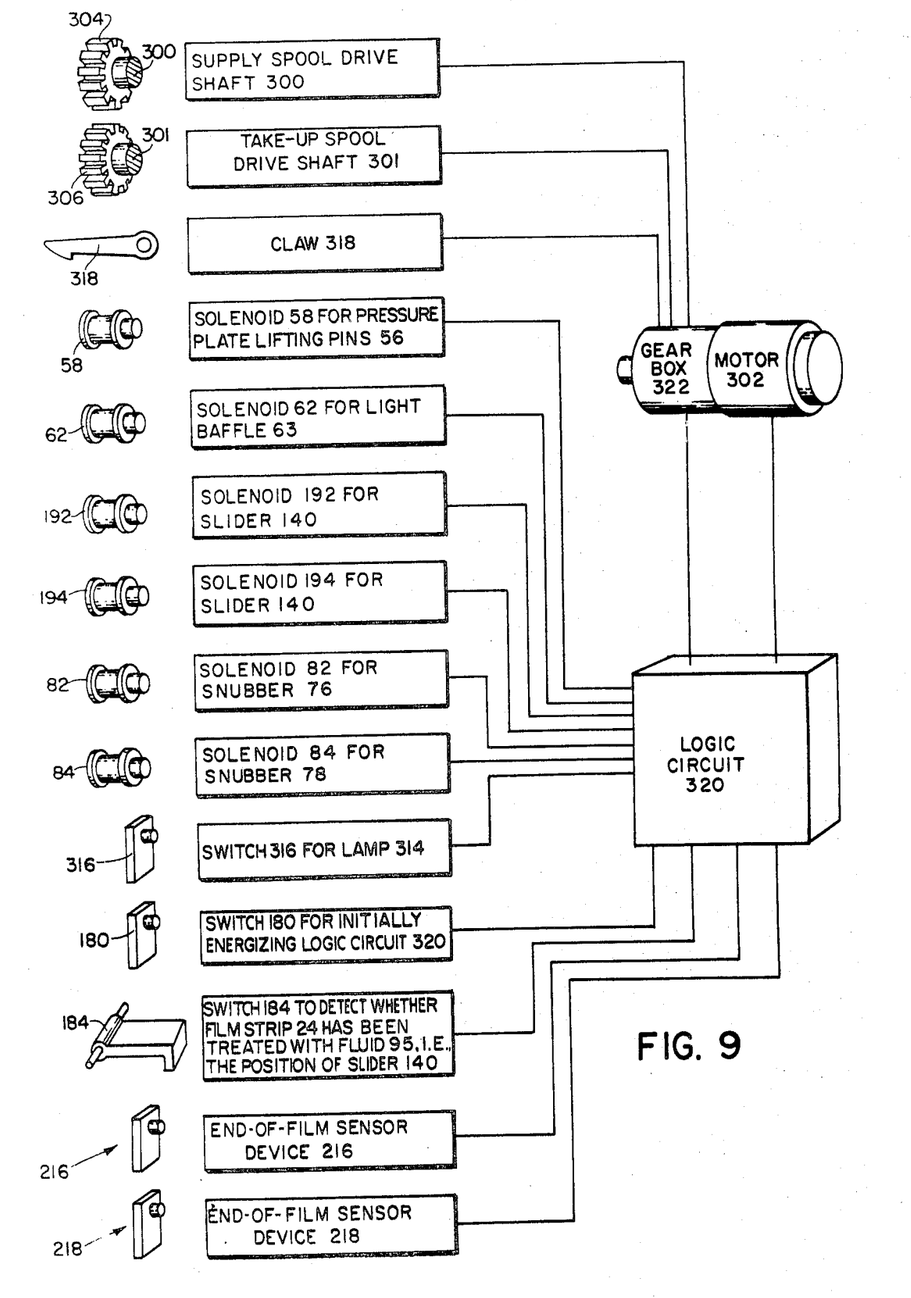
FIG. 9 is a block diagram of operational elements of a photographic system incorporating the present invention.
Figure 10A:
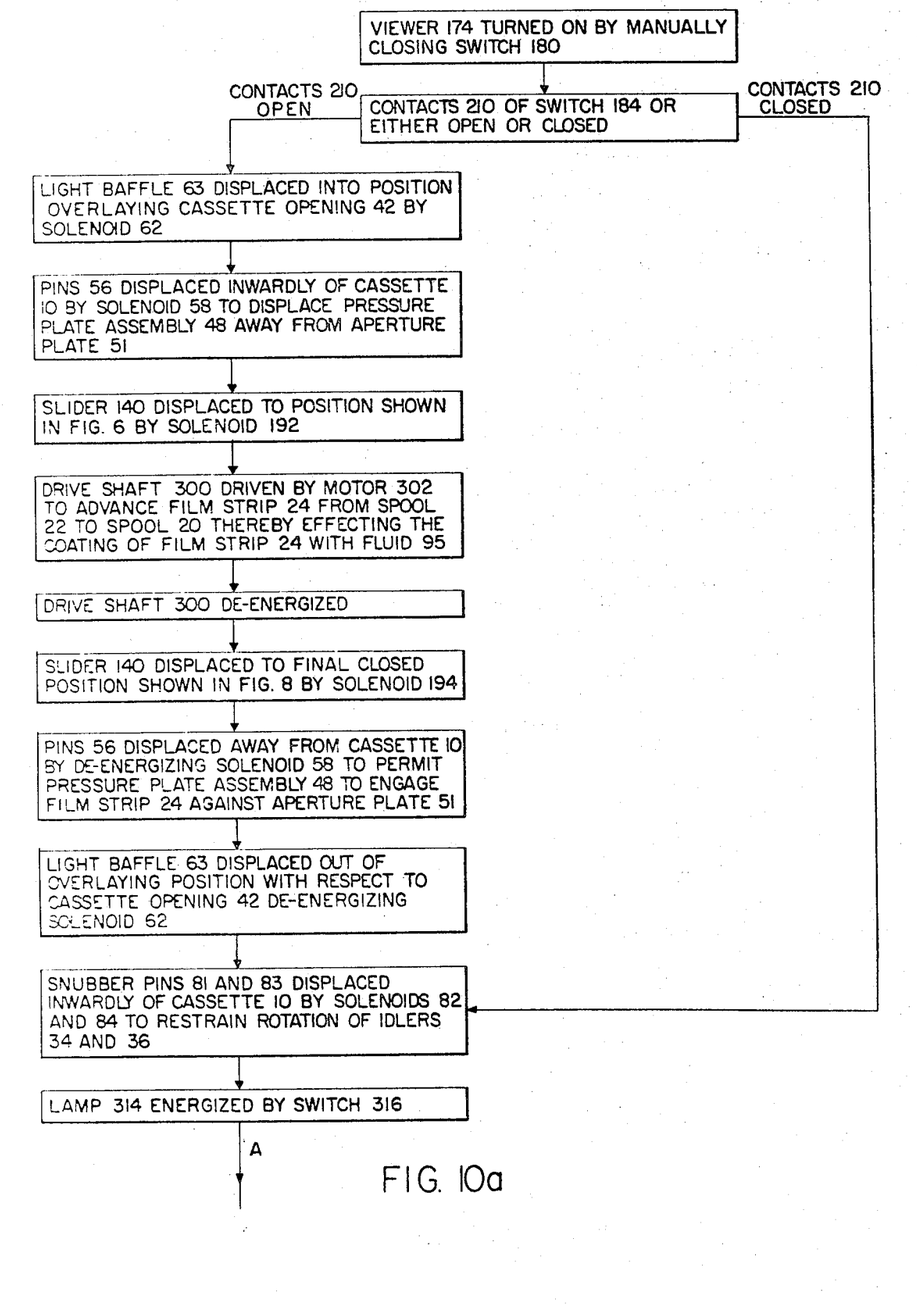
FIGS. 10A and 10B constitute a block diagram illustrating the operational sequence of a photographic system incorporating the present invention.
Figure 10B:
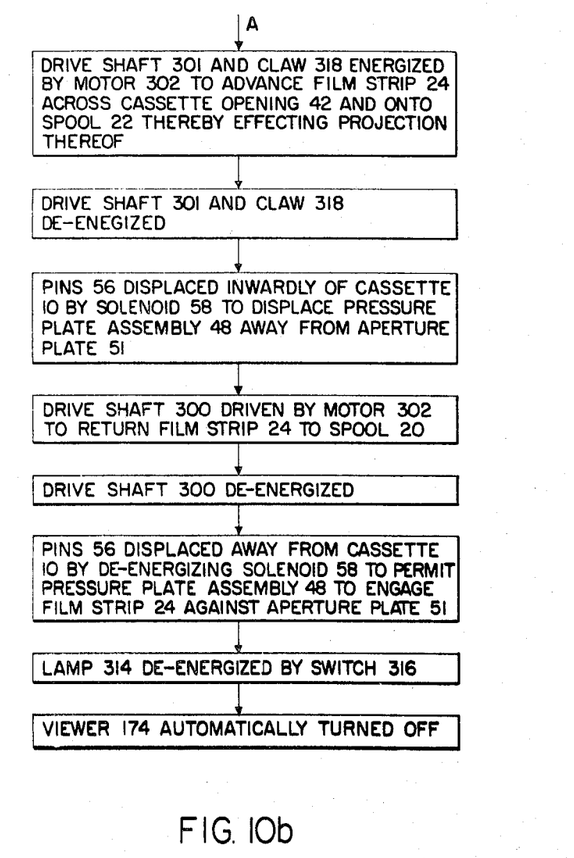

FIG. 9 diagrammatically illustrates certain operational elements of the viewer 174, while FIG. 10 diagrammatically illustrates the operational sequence of system operations employing those elements. In this respect, it will first be noted by referring to FIG. 9 that the viewer 174 includes a logic circuit 320. The design details of the logic circuit 320 comprise no part of the present invention and, since they may take any suitable form, have not been set forth herein. However, it is pointed out that the logic circuit 320 receives the necessary inputs from a viewer actuating switch 180, the switch 184 associated with the displacement of the cassette's slider 140 and the end of film sensors 216 and 218 to control system operation in accordance with predetermined programs. Further, the logic circuit 320 provides information to the motor 302 and an associated gear box 322 as necessary for the programmed operations of the viewer's drive shafts 300 and 301 and its claw 318. This logic circuit 320 further provides necessary information to the lamp switch 316 and the solenoids 58, 62, 82, 84, 192 and 194 to effect the desired operational programs on the film strip 24. Signals provided to the logic circuit 320 by the film's sensors 216 and 218 serve to assist that circuit in sequencing the functions of the operational programs, for instance, reverse-process, forward-project, reverse-rewind.

FIG. 10 clearly illustrates the operational sequence automatically performed by the photographic system when a cassette 10 is inserted into the viewer 174 and the viewer turned on. It should be recognized that FIG. 10 is a diagrammatic representation and the order of certain steps in the sequence may be reversed if desired. Additionally, certain steps may obviously be performed in unison. Since FIG. 9 is completely self-descriptive, any further detailed discussion of this operational sequence would be redundant and unnecessarily complicate the specification. However, it is particularly significant to note that once the viewer 174 has been turned on, its switch 184 automatically receives an indication from the cassette slider 140, i.e., resulting from the position of the arm 172 as to whether the film strip 24 retained in that particular cassette has been processed. If it has not been processed, cooperating means of the cassette 10 and viewer 174 automatically effect the performance of a first operational program with the film strip 24, i.e., processing, projection and rewind onto supply spool 20. If it has previously been processed, cooperating means of the cassette 10 and viewer 174 automatically effect the performance of an alternate operational program on the film strip 24, i.e. projection and rewind onto the supply spool 20.

Those familar with the photograhpic arts will readily appreciate the novel and highly unique advantages of this invention. Obviously the invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A photographic system comprising:
a cassette including:
a housing;
a strip of photographic material; and
means for cooperating with other apparatus when said cassette is operably associated therewith for performing a first operational program with said strip of photographic material, said first operational program including treating said strip of photographic material with a processing fluid, or alternately performing at least one of other operational programs with said strip of photographic material and for indicating to the other apparatus whether said first operational program has been performed; and
apparatus including:
a housing configured to operably receive said cassette; and
means for sensing the indication of said first mentioned means and for cooperating with said first mentioned means to effect said first operational program if said first cassette means indicates that said first operational program has not been performed or alternately cooperating with said first mentioned means to effect said one other operational program if said first mentioned means indicates that said first operational program has been performed.

2. The photographic system of claim 1 wherein said first operational program or said one other operational program is automatically performed responsive to information provided by said second mentioned means.

3. A photographic system comprising:
a cassette including:
a housing;
a strip of photographic material; and
means for cooperating with other apparatus when said cassette is operably associated therewith for performing a first operational program with said strip of photographic material so as to unalterably effect said strip or alternately performing at least one of operational programs with said strip of photographic material and for indicating to the other apparatus whether said first operational program has been performed, at least said first operational program or said one other operational program including the projection of viewable images on said strip of photographic material; and
apparatus including:
a housing configured to operably receive said cassette; and
means for sensing the indication of said first mentioned means and for cooperating with said first mentioned means to effect said first operational program if said first mentioned means indicates that said first operational program has not been performed or alternately cooperating with said first mentioned means to effect said one other operational program if said first mentioned means indicates that said first operational program has been performed.

4. The photographic system of claim 3 wherein said first operational program or said one other operational program is automatically performed responsive to information provided by said second mentioned means.

5. A photographic film handling cassette for use with apparatus including a housing configured to operably receive said cassette and means for sensing an indication from said cassette whether a first operational program has been performed on a strip of photographic material housed within said cassette, said first operational program including treating said strip of photographic material with a processing fluid, and for cooperating with said cassette for performing said first operational program if said first operational program has not been performed or alternately performing at least one of other operational programs with the strip of photographic material if said first operational program has been performed, said cassette including:
a housing;
a strip of photographic material within said housing; and
means for alternately cooperating with such apparatus means for performing said first operational program or said one other operational program and for indicating to such apparatus whether said first operational program has been performed.

6. The photographic film handling cassette of claim 5 wherein said first operational program or said one other operational program is automatically performed responsive to information provided by such apparatus means.

7. The photographic film handling cassette of claim 5 wherein said first operational program includes treating said strip of photographic material with a processing fluid and projecting one or more viewable images formed on said strip of photographic material as a result of said treatment and said one other operational program including projecting said viewable image or images.

8. The photographic film handling cassette of claim 5 wherein said first operational program includes treating said strip of photographic material with a processing fluid and said one other operational program does not include treating said strip of photographic material with a processing fluid.

9. A photographic film handling cassette for use with apparatus including a housing configured to operably receive said cassette and means for sensing an indication from said cassette whether a first operational program which unalterably effects a strip of photographic material housed within said cassette, has been performed and for cooperating with said cassette for performing said first operational program if said first operational program has not been performed or alternately performing at least one of other operational programs with the strip of photographic material if said first operational program has been performed, at least said first operational program or said one other operational program including the projection of viewable images on the strip of photographic material, said cassette including:
a housing;
a strip of photographic material within said housing; and
means for alternately cooperating with such apparatus means for performing said first operational program or said one other operational program and for indicating to such apparatus whether said first operational program has been performed.

10. The photographic film handling cassette of claim 9 wherein said first operational program or said one other operational program is automatically performed responsive to information provided by such apparatus means.

11. Photographic apparatus for use with a cassette including a housing, a strip of photographic material and means for alternately cooperating with said apparatus for performing a first operational program with such strip of photographic material, said first operational program including treating such strip of photographic material with a processing fluid, or performing at least one of other operational programs with such strip of photographic material and for indicating to said apparatus whether said first operational program has been performed, said apparatus including a housing configured to operably receive such cassette and means for sensing the indication of such cassette means and for cooperating with such cassette means for performing said first operational program if such cassette means indicates that said first operational program has not been performed or for cooperating with such cassette means for performing said one other operational program if such cassette means indicates that said first operational program has been performed.

12. The photographic apparatus of claim 11 wherein said first operational program or said one other operational program is automatically performed responsive to information provided by said apparatus means.

13. The photographic apparatus of claim 11 wherein said first operational program includes treating such strip of photographic material with a processing fluid and projecting one or more viewable images formed on such strip of photographic material as a result of said treatment and said one other operational program includes projecting such viewable image or images.

14. The photographic apparatus of claim 11 wherein said first operational program includes treating such strip of photographic material with a processing fluid and said one other operational program does not include treating such strip of photographic material with a processing fluid.

15. The photographic apparatus of claim 11 wherein at least said first operational program or said one other operational program includes the projection of viewable images on such strip of photographic material.

16. Photographic apparatus for use with a cassette including a housing, a strip of photographic material and means for alternately cooperating with said apparatus for performing a first operational program with such strip photographic material or performing at least one of other operational programs with such strip of photographic material and for indicating to said apparatus whether said first operational program has been performed, at least said first operational program or said one other operational program including the projection of viewable images on such strip of photographic material, said apparatus including a housing configured to operably receive such cassette means and for sensing the indication of such cassette means and for cooperating with such cassette means for performing said first operational program if such cassette means indicates that said first operational program has not been performed or for cooperating with such cassette means for performing said one other operational program if such cassette means indicates that said first operational program has been performed.

17. The photographic apparatus of claim 16 wherein said first operational program or said one other operational program is automatically performed responsive to information provided by said apparatus means.

18. Photographic apparatus for use with a cassette including a housing, a strip of photographic material and means for alternately cooperating with other apparatus for performing a first operational program with such strip of photographic material, said first operational program including treating such strip of photographic material with a processing fluid, or performing at least one of other operational programs with such strip of photographic material and for indicating to such other apparatus whether said first operational program has been performed, said apparatus including a housing configured to operably receive such cassette and means for sensing the indication of such cassette means and for cooperating with such cassette means for performing said first operational program if such cassette means indicates that said first operational program has not been performed.

19. The photographic apparatus of claim 18 wherein said first operational program is automatically performed responsive to information provided by said apparatus means.

20. Photographic apparatus for use with a cassette including a housing, a strip of photographic material and means for alternately cooperating with other apparatus for performing a first operational program with such strip of photographic material, said first operational program including treating such strip of photographic material with a processing fluid, or performing at least one of other operational programs with such strip of photographic material and for indicating to such other apparatus whether said first operational program has been performed, said apparatus including a housing configured to operably receive such cassette and means for sensing the indication of such first cassette means and for cooperating with such cassette means for performing said one other operational program if such cassette means indicates that said first operational program has been performed.

21. The photographic apparatus of claim 20 wherein said one other operational program is automatically performed responsive to information provided by said apparatus means.

22. Photographic apparatus for use with a cassette including a housing, a strip of photographic material and means for alternately cooperating with other apparatus for performing a first operational program with such strip of photographic material so as to unalterably effect such strip, or performing at least one of other operational programs, at least said first operational program or said one other operational program including the projection of viewable images on such strip of photographic material, with such strip of photographic material and for indicating to such other apparatus whether said first operational program has been performed, said apparatus including a housing configured to operably receive such cassette and means for sensing the indication of such cassette means and for cooperating with such first cassette means for performing said one other operational program if such cassette means indicates that said first operational program has been performed.

23. The photographic apparatus of claim 22 wherein said one other operational program is automatically performed responsive to information provided by said apparatus means.

24. A photographic system comprising:
a cassette including:
a housing;
a strip of photographic material; and
means for cooperating with other apparatus when said cassette is operably associated therewith for performing a first operational program with said strip of photographic material, said first operational program including treating said strip of photographic material with a processing fluid, or alternately performing at least one of other operational programs with said strip of photographic material and for indicating to the other apparatus whether said first operational program has been performed, said cassette means including a displaceably mounted member which is displaced from a first position into a second position responsive to the performance of said first operational program; and
apparatus including:
a housing configured to operably receive said cassette; and
means for sensing whether said displaceably mounted cassette member has been displaced from its said first position into its said second position and for cooperating with said cassette means to effect said first operational program if said cassette means indicates that said first operational program has not been performed or alternately cooperating with said cassette means to effect said one other operational program if said cassette means indicates that said first operational program has been performed.

25. The photographic system of claim 24 wherein said first operational program or said one other operational program is automatically performed responsive to information provided by said apparatus means.

26. Photographic apparatus for use with a cassette including a housing, a strip of photographic material and means for alternately cooperating with said apparatus for performing a first operational program with such strip of photographic material, said first operational program including treating such strip of photographic material with a processing fluid, or performing at least one of other operational programs with such strip of photographic material and for indicating to said apparatus whether said first operational program has been performed including a displaceably mounted member which is displaced from a first position into a second position responsive to the performance of said first operational program, said apparatus including a housing configured to operably receive such cassette and means for sensing whether such displaceably mounted cassette member has been displaced from its first position into its second position and for cooperating with such cassette means for performing said first operational program if such cassette means indicates that said first operational program has not been performed or for cooperating with such cassette means for performing said one another operational program if such cassette means indicates that said first operational program has been performed.

27. The photographic apparatus of claim 26 wherein said first operational program or said one other operational program is automatically performed responsive to information provided by said apparatus means.

28. A photographic system comprising:
a cassette including:
a housing;
a strip of photographic material;
means for cooperating with other apparatus for performing a given operational program with said strip of material, said given operational program configured for unalterably effecting said strip unless a first operational program has been previously performed with said strip, and for indicating to the other apparatus whether the first operational program has been performed; and
apparatus including:
a housing configured to operably receive said cassette;
means for sensing the indication of said cassette means and for cooperating therewith to prevent performing of said given operational program if said cassette means indicates that the first operational program has not been performed.

29. The system of claim 28 wherein the first operational program includes treating said strip of photographic material to render it substantially insensitive to light, and said given program includes illuminating said film strip.

30. The system of claim 28 wherein said cassette means includes means for cooperating with said other apparatus or different apparatus for performing said first operational program including treating said strip of photographic material so as to develop viewable images thereon, and said given operational program includes illuminating said strip to project images therefrom.

31. Photographic apparatus for use with a cassette including a housing, a strip of photographic material and means for cooperating with said apparatus for performing a given operational program with such strip of photographic material, said given operational program configured for unalterably effecting such strip of photographic material unless a first operational program has been previously performed with such strip of photographic material, and for indicating to said apparatus whether said first operational program has been performed, said apparatus including a housing configured to operably receive such cassette and means for sensing the indication of such cassette means and for cooperating therewith to prevent performing of said given operational program if such cassette means indicates that said first operational program has not been performed.

32. The apparatus of claim 31 wherein such first operational program includes treating such strip to render it substantially insensitive to light, and said given program includes illuminating said film strip.

* * * * *